No. 688,958. Patented Dec. 17, 1901.
W. H. LYMAN.
MACHINE FOR CULTIVATING ORCHARDS.
(Application filed Nov. 28, 1900.)
(No Model.) 4 Sheets—Sheet 1.

No. 688,958. Patented Dec. 17, 1901.
W. H. LYMAN.
MACHINE FOR CULTIVATING ORCHARDS.
(Application filed Nov. 28, 1900.)
(No Model.) 4 Sheets—Sheet 3.

WITNESSES:

INVENTOR
William H. Lyman
BY S. A. Hazeltine
Attorney

No. 688,958. Patented Dec. 17, 1901.
W. H. LYMAN.
MACHINE FOR CULTIVATING ORCHARDS.
(Application filed Nov. 28, 1900.)
(No Model.) 4 Sheets—Sheet 4.

WITNESSES:
L. C. Hills.
J. U. Allmon.

INVENTOR
William H. Lyman
BY S. A. Haseltine
Attorney

THE NORRIS PETERS CO., PHOTO-LITHO., WASHINGTON, D. C.

UNITED STATES PATENT OFFICE.

WILLIAM H. LYMAN, OF SPRINGFIELD, MISSOURI.

MACHINE FOR CULTIVATING ORCHARDS.

SPECIFICATION forming part of Letters Patent No. 688,958, dated December 17, 1901.

Application filed November 28, 1900. Serial No. 38,037. (No model.)

*To all whom it may concern:*

Be it known that I, WILLIAM H. LYMAN, a citizen of the United States, residing at Springfield, in the county of Greene and State of Missouri, have invented certain new and useful Improvements in Machines for Cultivating Orchards; and I do hereby declare the following to be a full, clear, and exact description of the invention, such as will enable others skilled in the art to which it appertains to make and use the same.

My invention relates to improvements in machines for cultivating orchards and farms.

The object of the invention is to provide a cheap, simple, and durable frame or carriage for attaching different kinds of farming implements, and especially for attaching a tree-cultivator, so as to be adjusted to the different ground over which the cultivator runs, so as to throw the dirt in any desired direction, and to cultivate under the limbs clear up to the tree without injury to the fruit-tree or roots. These objects I attain by means of the mechanism hereinafter fully described, set forth in the claims, and illustrated in the accompanying drawings, forming a part of this specification, in which—

Figure 1:
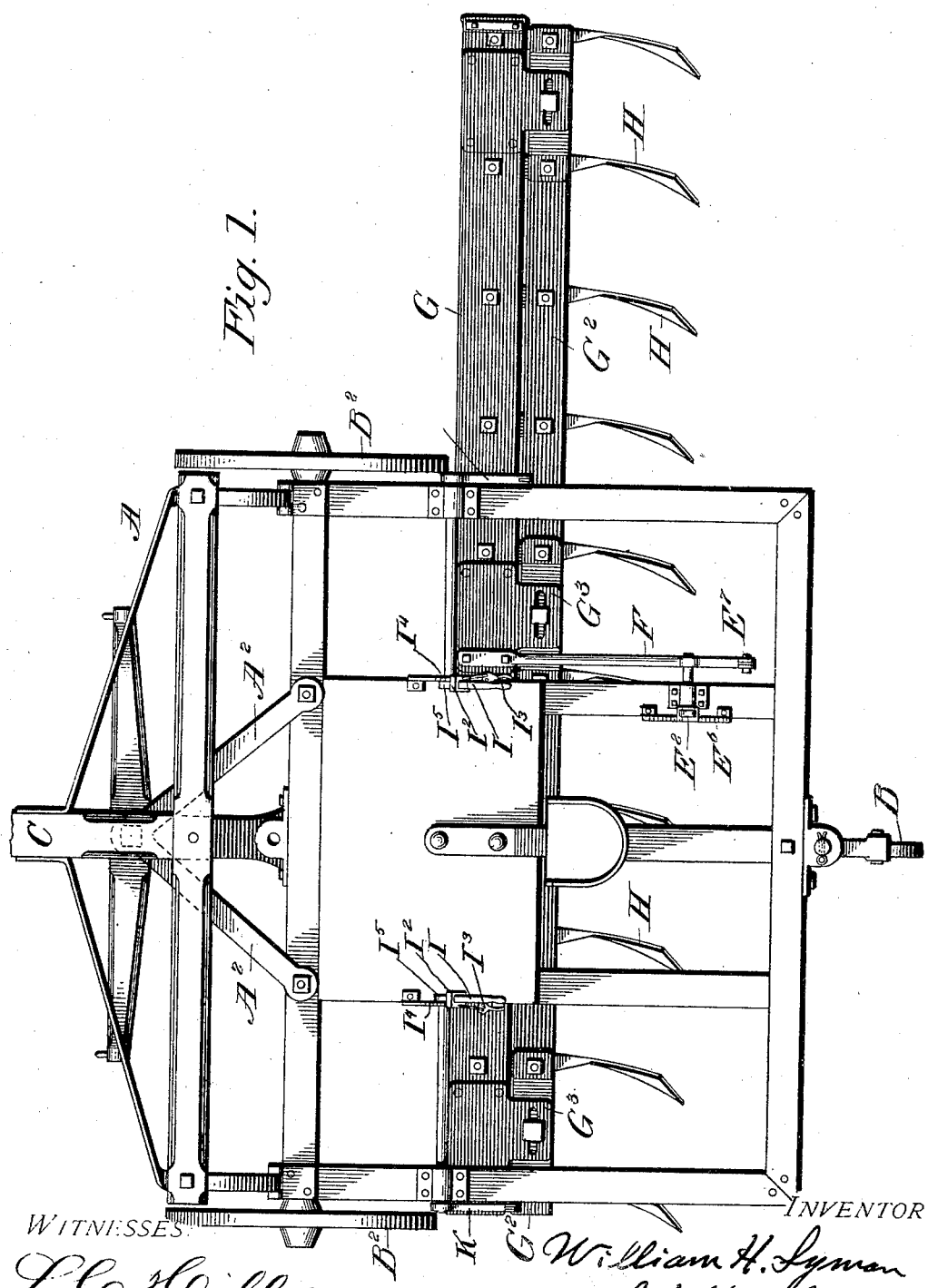
Figure 2:
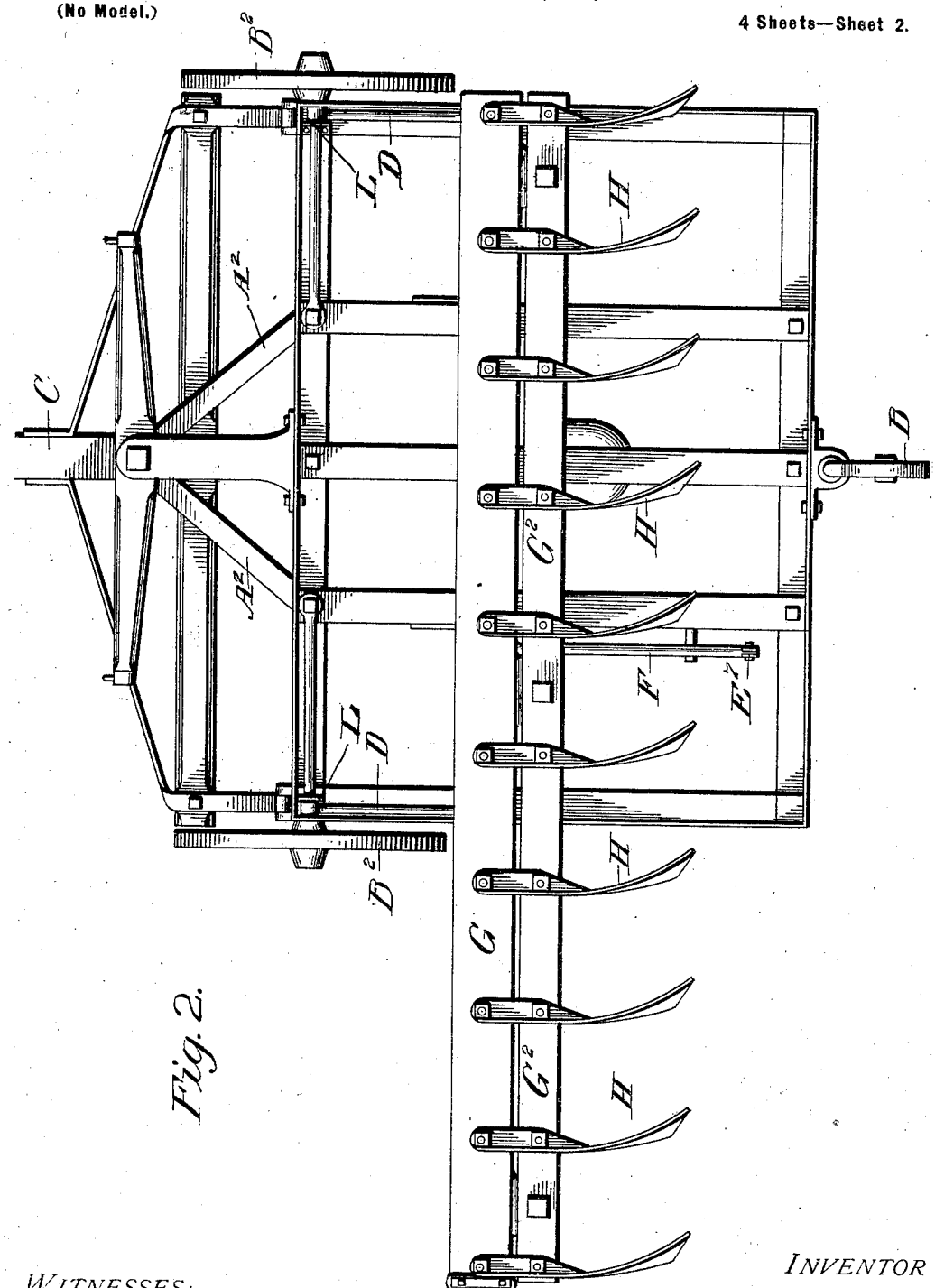
Figure 3:
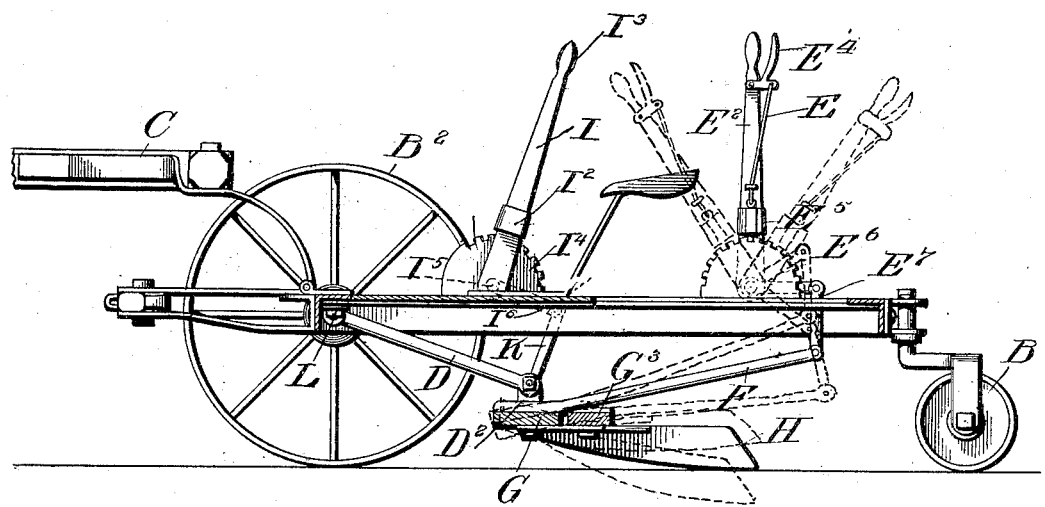
Figure 4:
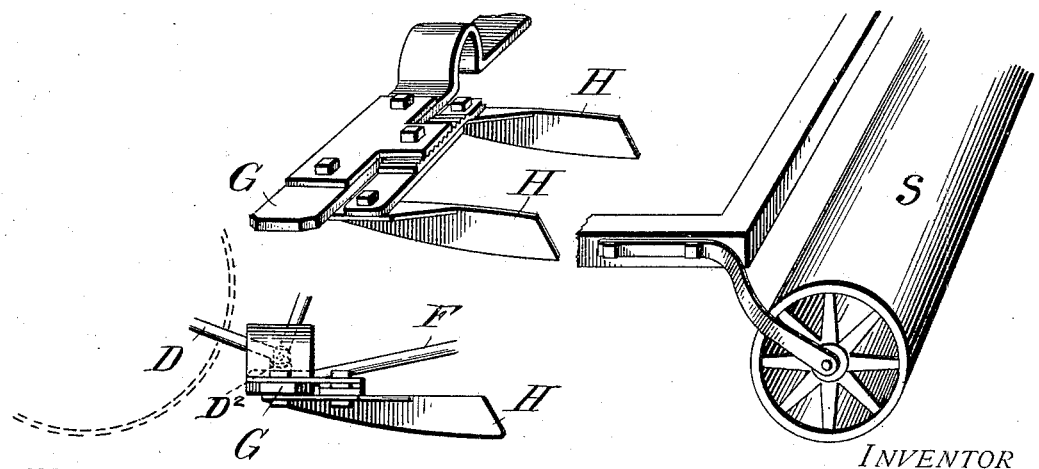
Figure 5:
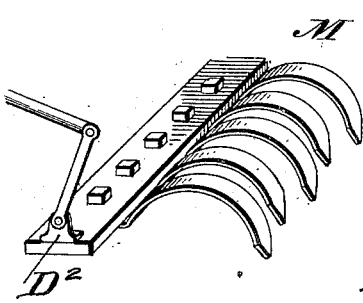
Figure 6:
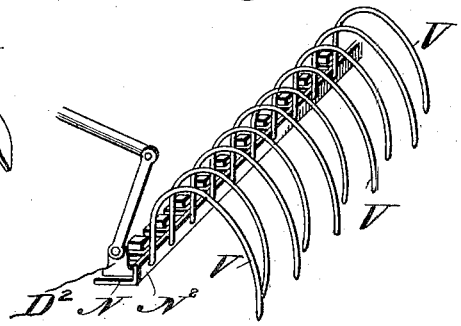
Figure 7:
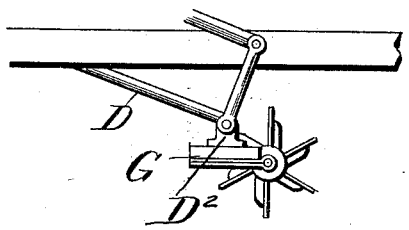
Figure 8:
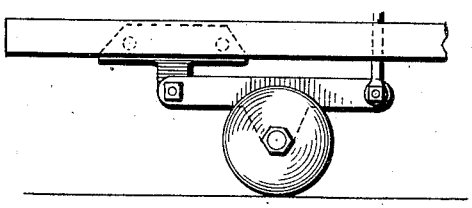
Figure 9:
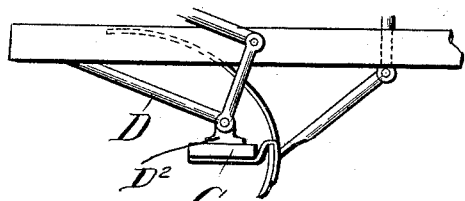
Figure 10:
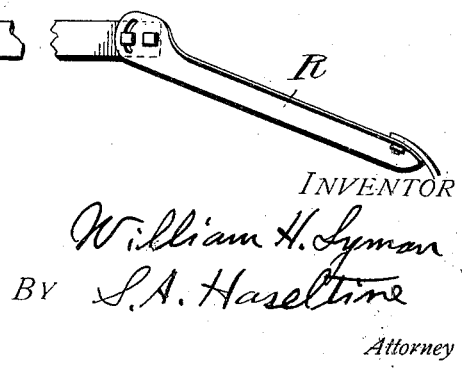

Figure 1 is a top elevation of the entire device. Fig. 2 is a similar view from the bottom side. Fig. 3 is a detail view, in vertical longitudinal section, with parts in elevation, showing the levers, with their attachments. Fig. 4 is a detailed view of the attaching-block, a pair of blades, and a lever and connections. Fig. 5 shows the harrow; Fig. 6, a rake and weeder; Fig. 7, a stalk-cutter; Fig. 8, a disk harrow. Fig. 9 is a grader. Fig. 10 is a smoother.

Similar letters of reference indicate corresponding parts in the several figures.

A is a framework of the carriage, made any desired size and shape, preferably made of angle iron or steel, as shown, provided with a seat for the driver, levers for raising and lowering the cultivator, and also a lever for adjusting the depth of the cultivator by raising or lowering the teeth or plows. Said frame A rests upon three wheels, the back one B being pivoted to swing in any desired direction to enable the carriage to turn as desired, the front end being provided with a tongue C for guiding the same. Said tongue is preferably hinged to the frame and made light to be easy upon the team. The whiffletrees are attached to braces $A^2$ on the front side of the frame for making a low draft on the machine. Side wheels $B^2$ may be made any desired height for supporting the frame. To the said frame A are secured two hinged rods D, the upper end being, preferably, hinged to the axle of wheels $B^2$, the back ends being hinged to blocks $D^2$, which are attached to the bar G of the implement. There are two of these blocks, one at each side of the machine, thus enabling the implement to be raised and lowered as desired. This object I accomplish by means of the lever $E^2$. This lever $E^2$ is provided with the ordinary thumb-piece $E^4$ and connecting-rod E for operating a sliding ratchet $E^5$, said sliding ratchet $E^5$ for holding the lever in place to keep the implement in any desired position. The lever $E^2$ has suitable bearings in the stationary ratchet $E^6$ and in the frame A.

$E^7$ is a link having pivotal connection with the bar F and the lower horizontal extension of the lever $E^2$. (See Fig. 3.) Thus by raising the lever $E^2$ the bar G, to which the shovels or blades H are attached, is tilted, and by lowering the lever the bar is returned to its former position, as desired.

The machine may be adjusted to any shaped ground by means of the lever $E^2$, and also the depth of the shovels or blades H may be regulated by the same lever.

I is a lever having a spring-ratchet $I^2$, with a thumb-piece $I^3$ for operating the same in a ratchet $I^4$. Said lever I also has suitable bearings $I^5$ in the frame A and an arm $I^6$.

K is a link hinged to the arm $I^6$ of lever I at one end, the other end being hinged to the bar G. The bar G is raised bodily by coöperation of the levers $E^2$ and I.

L is a support attached to the bar G, so that as the lever I is raised it raises the back part of the bar G and when lowered lowers the same, and thus raises the back ends of the blades H or puts them deeper when desired. Rotating disks may be used in place of the blades; but I prefer the blades.

The bar G has the blocks $D^2$ rigidly secured thereto. Said bar G may be set so as to have one end project to one side, so as to cultivate under the limbs of trees without injury to the fruit, or may be set in the middle of the frame, as desired. I pad the outer end of bar G when the device is used for circular cultivation around trees. Said bar G may be provided with different tools, blades, or plows, or the bar may be replaced by other bars having different tools attached. To illustrate, the blades H may be replaced with teeth for a spring-toothed harrow, as shown at Fig. 5. Said harrow M may be changed into a marker by removing part of the teeth, or a cultivator by removing teeth to straddle the rows.

The roller S or smoother R may be used in connection with the tree cultivator or harrow. For this purpose they are attached to the back part of the frame A by any suitable means.

Cultivators are attached under the frame A the same as bar G, heretofore described. Said cultivators are for cultivating corn-rows, and cultivate from one to three rows at a time. The blades are arranged to throw the dirt to or from the plants, as desired.

Blades H are provided with double fastenings, the front end being secured to bar G, the other bolt or fastening being attached to a false or sliding bar $G^2$. Said sliding bar $G^2$ is attached to the bar G by means of plates $G^3$. Said plates and sliding bar are provided with ratchets or teeth to hold the same firmly in any desired position for setting the blades at different angles. Said blades H have a sharp lower edge, which extends downward and backward, while the body of the blade is curved similar to a plowshare, so that the edge of the blade instead of the point cuts into the ground and throws it to one side, thus acting as a number of small plows, yet having no forward-projecting points to catch upon roots or rocks, so that in cultivating trees it will loosen the surface of the ground and destroy the weeds and vegetation without injuring the roots of the trees. Said blades are made rights and lefts, as desired.

The rake shown in Fig. 6 consists of a bar N, made of one piece of angle steel, having an upward projection $N^2$, through which are holes at suitable distances for the teeth V to pass through. Said teeth V are made thus: A piece of spring-steel is bent in the middle, so as to permit the two ends to pass through the holes in $N^2$ to form two teeth, the loop or bend in the middle being provided with a bolt through the bar N, which holds the two teeth firmly in position.

In order that the levers may raise and lower the ends of the cultivator, suitable provision should be made for flexing the lever attachments longitudinally. Any well-known means for this purpose may be employed.

Having thus described my invention, what I claim as new, and desire to secure by Letters Patent, is—

1. In a machine for cultivating orchards the combination with the frame and the transverse bar G, and the shovels carried thereby, of a lever for tilting the said bar, and a lever and connections with the said bar attached to the bar in the same transverse plane as the attachment of the first-mentioned lever constructed for coöperation with the tilting lever for raising said bar bodily, as set forth.

2. In combination with blade H for stirring the ground; of bars G, $G^2$; frame A, having wheels B, $B^2$; lever $E^2$, for tilting said bar and a lever I coöperating with the lever $E^2$ for raising and lowering the said bar G and the cutting-blades.

3. In combination with a frame A, having wheels B, $B^2$, of a bar G, provided with tools for stirring the ground and lever $E^2$, I, and a tongue C, for guiding the same, all substantially as shown and described.

4. The combination of a frame, wheels upon which it is mounted, blades for stirring the ground, a transverse bar, levers for adjusting the depth of the blades, and means pivotally connected to said bar by pivotal connections for raising said bar bodily, all substantially as and for the purpose described.

In testimony whereof I affix my signature in presence of two witnesses.

WILLIAM H. LYMAN.

Witnesses:
S. A. HASELTINE,
W. H. PRESTON.